(12) United States Patent
Martin, III (10) Patent No.: US 8,579,754 B2
(45) Date of Patent: Nov. 12, 2013

(54) ADJUSTING RING LOCK

(75) Inventor: Robert J. Martin, III, Newark, OH (US)

(73) Assignee: Arvinmeritor Technology, LLC, Troy, MI (US)

( * ) Notice: Subject to any disclaimer, the term of this patent is extended or adjusted under 35 U.S.C. 154(b) by 203 days.

(21) Appl. No.: 13/192,710

(22) Filed: Jul. 28, 2011

(65) Prior Publication Data

US 2013/0029798 A1    Jan. 31, 2013

(51) Int. Cl.
*F16H 48/06* (2006.01)

(52) U.S. Cl.
USPC ............................................. 475/230

(58) Field of Classification Search
USPC ...................... 475/230; 74/665 GB
See application file for complete search history.

(56) References Cited

U.S. PATENT DOCUMENTS

| | | |
|---|---|---|
| 1,886,924 A | 11/1932 | Van Ranst |
| 2,016,343 A | 10/1935 | Oberem |
| 2,047,336 A | 7/1936 | Stout |
| 2,942,893 A | 6/1960 | Nallinger |
| 2,978,054 A | 4/1961 | Ludwig |
| 3,213,700 A | 10/1965 | Brownyer |
| 3,231,040 A | 1/1966 | Blanchette |
| 3,310,999 A | 3/1967 | Griffith |
| 3,333,866 A | 8/1967 | Cuskie |
| 3,401,763 A | 9/1968 | Rolt |
| 3,403,746 A | 10/1968 | Fox et al. |
| 3,497,235 A | 2/1970 | Peer |
| 3,872,741 A | 3/1975 | Berchtold et al. |
| 4,630,699 A | 12/1986 | Yamada et al. |
| 4,651,587 A | 3/1987 | Anderson et al. |
| 4,699,235 A | 10/1987 | Anderson |
| 4,705,128 A | 11/1987 | Krude |
| 4,733,578 A | 3/1988 | Glaze et al. |
| 5,070,745 A | 12/1991 | Lindsey et al. |
| 5,162,026 A | 11/1992 | Krisher |
| 5,515,940 A | 5/1996 | Shichinohe et al. |
| 5,624,345 A | 4/1997 | Graft et al. |
| 5,673,777 A | 10/1997 | Ziech |
| 5,806,371 A | 9/1998 | Hibbler et al. |
| 6,093,127 A | 7/2000 | DiDomenico et al. |
| 6,227,716 B1 | 5/2001 | Irwin |
| 6,398,689 B1 | 6/2002 | Morse et al. |
| 6,474,873 B1 | 11/2002 | Krisher et al. |

(Continued)

FOREIGN PATENT DOCUMENTS

JP        59144856 A     8/1984

OTHER PUBLICATIONS

U.S. Appl. No. 13/046,943.

(Continued)

*Primary Examiner* — Edwin A Young
(74) *Attorney, Agent, or Firm* — Brooks Kushman P.C.

(57) ABSTRACT

A locking mechanism for a differential assembly includes an adjusting ring and a retainer. The adjusting ring is rotatable about an axis and has an inner peripheral surface and an outer peripheral surface. The adjusting ring is adjustable to set a desired preload. A plurality of pockets is formed within the outer peripheral surface, and the pockets are circumferentially spaced apart from each other about the axis. The retainer has a portion that at least partially extends into one of the pockets to prevent rotation of the adjusting ring about the axis once the desired preload is achieved.

20 Claims, 6 Drawing Sheets

(56) References Cited

U.S. PATENT DOCUMENTS

| | | |
|---|---|---|
| 6,540,640 B2 | 4/2003 | Hibbler et al. |
| 7,108,428 B2 | 9/2006 | Ason et al. |
| 7,175,560 B2 | 2/2007 | Petruska et al. |
| 7,393,141 B2 | 7/2008 | Fahrni et al. |
| 7,485,065 B2 | 2/2009 | Kearney |
| 7,559,403 B2 | 7/2009 | Schmitz |
| 7,794,153 B2 | 9/2010 | Szczepanski et al. |
| 7,866,433 B2 | 1/2011 | Martin et al. |
| 2002/0198075 A1 | 12/2002 | Prucher |
| 2008/0280720 A1* | 11/2008 | Ina et al. .................. 475/230 |
| 2009/0211386 A1 | 8/2009 | Hayes |
| 2010/0130326 A1* | 5/2010 | Waksmundzki ............. 475/230 |
| 2010/0255948 A1* | 10/2010 | Hewins et al. ............. 475/230 |

OTHER PUBLICATIONS

European Search Report for European Patent Application No. 12177382.4-2421 completed Nov. 5, 2012.

* cited by examiner

ADJUSTING RING LOCK

TECHNICAL FIELD

This invention generally relates to a locking mechanism for an adjusting ring in a differential.

BACKGROUND OF THE INVENTION

A differential assembly includes a differential gear set mounted within a differential case comprised of a flange case half and a plain case half. The differential assembly is positioned within a carrier bowl portion of an axle housing and is supported on a pair of differential bearings for rotation within the axle housing. The bowl portion includes bearing mount structures with differential leg caps that mount the bearings. One differential bearing is mounted between the flange case half and one bearing mount structure and the other differential bearing is mounted between the plain case half and another bearing mount structure.

Adjusting rings are attached to the bearing mount structures. The adjusting rings include a threaded portion on one side that is threaded into engagement with the bearing mount structure and a plurality of teeth are formed on an opposite side that are separated from each other by grooves. The teeth are formed on an inner peripheral surface of the ring and extend radially inward toward a center of the adjusting ring. Inboard end faces of the adjusting rings abut against the differential bearings such that rotation of the adjusting rings sets a desired bearing preload. Once the desired bearing preload is set, a lock tab is installed to lock the adjusting ring in place, i.e. the lock tab prevents any further rotation of the adjusting ring.

A traditional lock tab assembly includes a plate that is attached to the bearing mount structure with a pair of fasteners. The plate includes a curved lock finger that extends radially inward toward the center of the adjusting ring. A distal end of the curved lock finger is received within one of the grooves. Once the lock finger is positioned within a groove, the adjusting ring is no longer able to rotate.

For larger sized carriers, the flange side differential bearing and adjusting ring have increased outer diameters in order to provide a desired load carrying capacity and life requirement. These larger diameters have resulted in the lock tab being offset from a center of the differential to a point where the plate and fasteners protrude beyond a wall of the housing bowl portion, i.e. there is no longer sufficient clearance between the lock tab assembly and the housing bowl portion.

SUMMARY OF THE INVENTION

A locking mechanism for a differential assembly includes an adjusting ring and at least one retainer. The adjusting ring is rotated about an axis to set a desired bearing preload. The adjusting ring includes a plurality of pockets that are formed about an outer peripheral surface of the adjusting ring. To lock the adjusting ring in place, i.e. to prevent further rotation of the adjusting ring once preload is set, the retainer is installed such that a portion of the retainer is at least partially received within one of the pockets.

In one example, the locking mechanism is used in a carrier for an axle assembly that includes a housing with a bowl portion having bearing mount structures to mount a pair of differential bearings. A differential assembly is mounted within the bowl portion and includes a differential gear set enclosed within a differential case comprised of first and second case halves. The retainer has a mount portion fixed to one of the bearing mount structures and a retaining portion that is at least partially received within one of the pockets of the adjusting ring to prevent rotation of the adjusting ring about the axis when the mount portion is fixed to the bearing mount structure.

In one example, a method of locking an adjusting ring comprises the steps of: (a) providing an adjusting ring having an inner peripheral surface and an outer peripheral surface with a plurality of pockets formed within the outer peripheral surface; (b) threadably attaching the adjusting ring to a bearing mount structure to set a desired differential bearing preload; and (c) inserting at least one retainer into a bore formed in the bearing mount structure such that a retaining portion of the retainer is at least partially received within one of the plurality of pockets to prevent further rotation of the adjusting ring once the desired differential bearing preload is achieved.

These and other features of the present invention can be best understood from the following specification and drawings, the following of which is a brief description.

DETAILED DESCRIPTION OF THE PREFERRED EMBODIMENT

Figure 1:
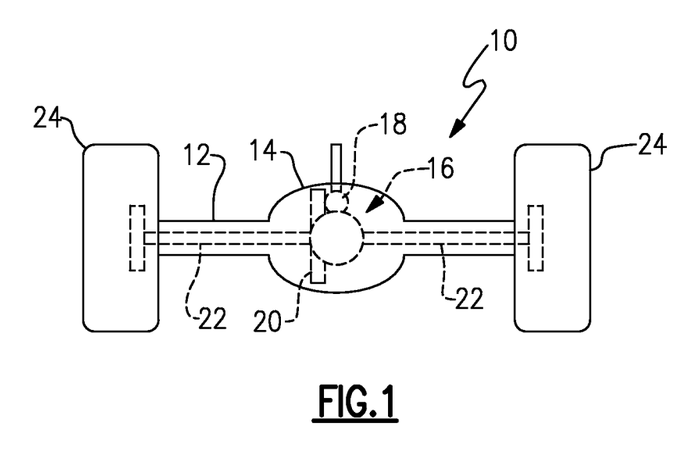
FIG. 1 is a schematic view of an axle assembly with a differential assembly.
Figure 2:
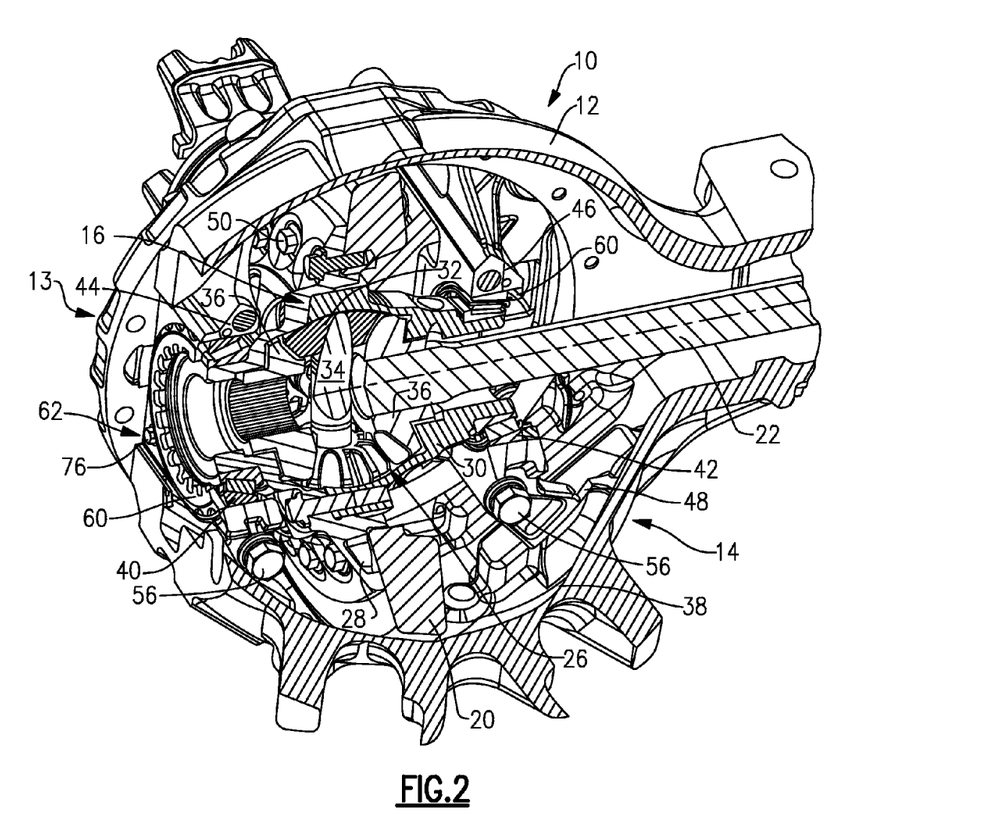
FIG. 2 is a cross-sectional view of a carrier and differential assembly incorporating the subject invention.

FIG. 1 shows one example of a drive axle assembly 10 that includes an axle housing 12 and a carrier assembly 13 that is positioned in a bowl portion 14 of the axle housing 12. As shown in FIG. 2, a differential assembly 16 is positioned within the carrier assembly 13. An input gear set, which includes a pinion gear 18 and ring gear 20, provides driving input to the differential assembly 16. The differential assembly 16 is configured to drive a pair of axle shafts 22 which are respectively associated with a pair of wheel end assemblies 24 that are laterally spaced apart from each other.

The differential assembly 16 is shown in greater detail in FIG. 2. The differential assembly 16 includes a differential gear set 26 mounted within a differential case that is comprised of first and second case halves. In one example, the first and second case halves comprise a flange case half 28 and a plain case half 30. The differential gear set 26 includes four gears 32 (only two of the four gears 32 are shown in FIG. 2) that are mounted on a differential spider 34 that is shaped like a cross. One gear 32 is mounted on each of the four legs of the cross-shaped spider 34 as known. The differential gears 32 are in meshing engagement with side gears 36. One side gear 36 is fixed for rotation with one of the axle shafts 22 (FIG. 1). The differential assembly 16 allows the axle shafts 22 to rotate at different speeds when needed, such as when the vehicle is executing a turning maneuver for example.

Figure 4:
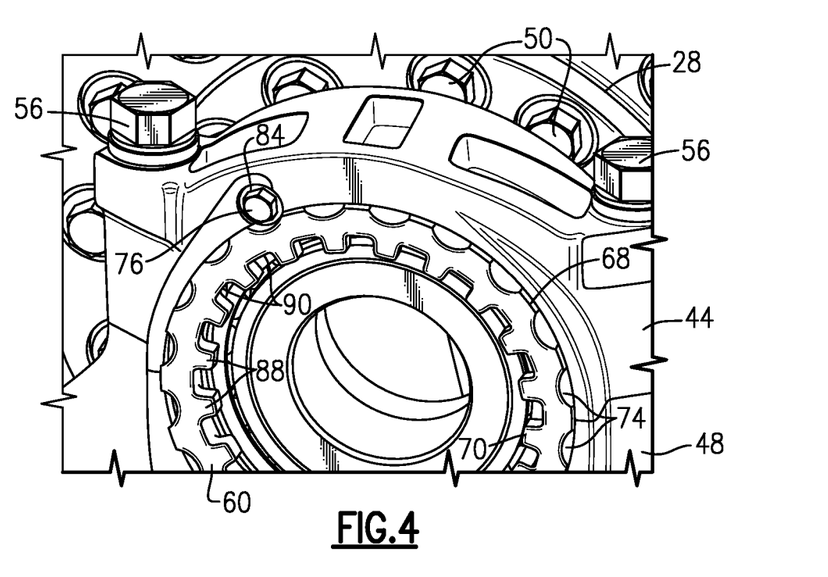
FIG. 4 is an end view of a differential locking mechanism incorporating the subject invention.
Figure 5:
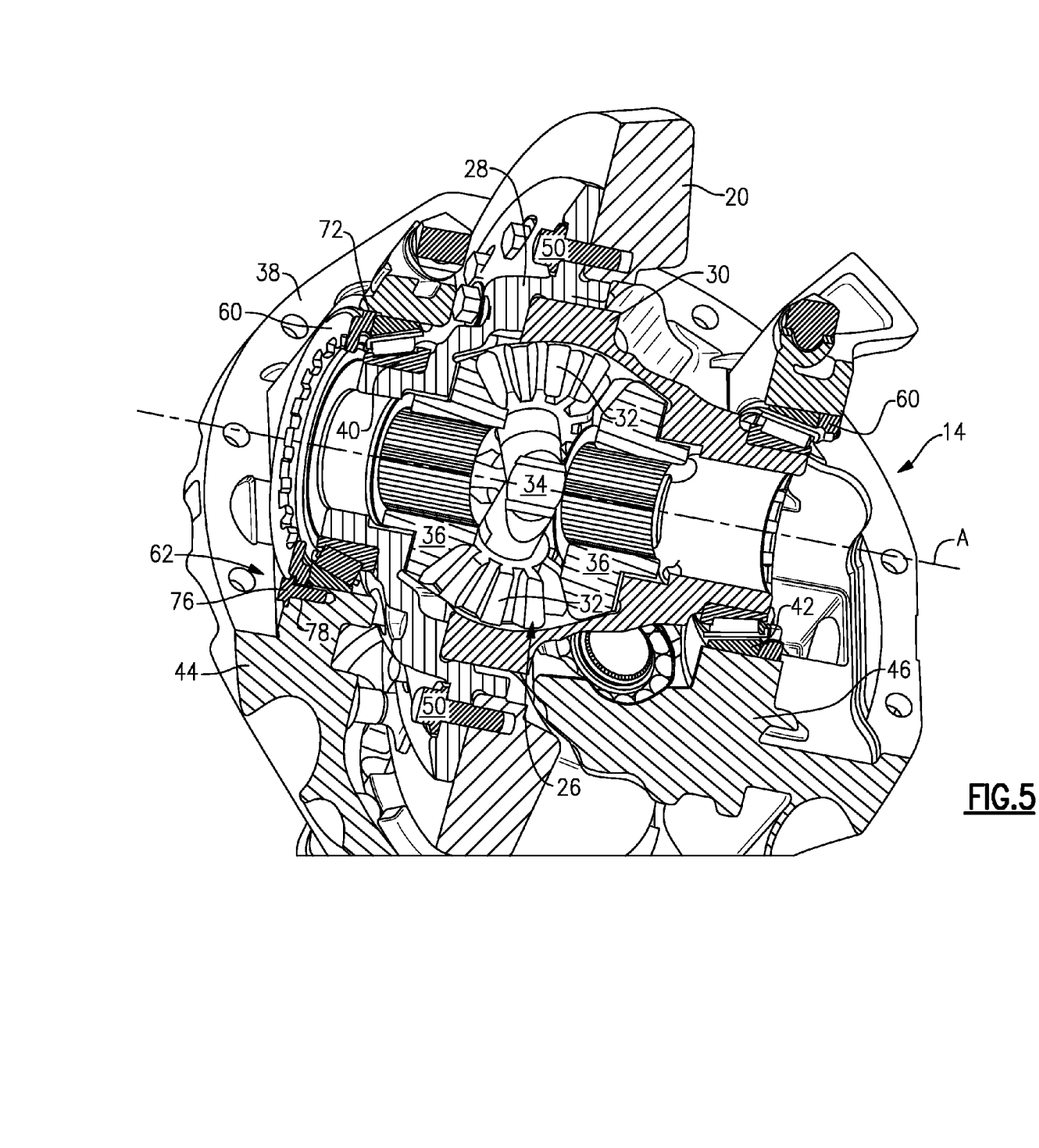
FIG. 5 is a cross-sectional view of a differential assembly and the differential locking mechanism of FIG. 4.

The differential assembly 16, which is associated with the carrier assembly 13, is positioned within the bowl portion 14 of the axle housing 12 and is enclosed by a bowl cover 38. The differential assembly 16 is supported by first 40 and second 42 differential bearings for rotation within the axle housing 12. Within the bowl portion 14 are bearing mount structures that are used to mount the differential bearings 40, 42. In one example, the bearing mount structures are comprised of mounting bosses 48 formed within the cover 38 of the bowl portion 14 (best shown in the examples of FIGS. 4 and 8) and first 44 and second 46 differential leg caps that are attached to the mounting bosses 48. The differential leg caps 44, 46 are attached with fasteners 56 to the mounting bosses 48 to form the first and second bearing mount structures that mount the differential bearings 40, 42 in place. As shown, the first differential bearing 40 is mounted between the flange case half 28 and one bearing mount structure and the second differential bearing 42 is mounted between the plain case half 30 and the other bearing mount structure.

The flange 28 and plain 30 case halves are secured together with a plurality of fasteners as known. The ring gear 20 is fixed for rotation with the flange case half 28. In one example, the ring gear 20 is attached to the flange case half 28 with a plurality of fasteners 50; however, other attachment methods could also be used.

The differential assembly 16 includes at least one adjusting ring 60 that is used to set gear tooth contacts and bearing preloads to desired levels. In the example shown in FIG. 1, one adjusting ring 60 is attached to each of the bearing mount structures. The adjusting rings 60 are rotatable about an axis A to set the desired gear contacts and preload. A locking mechanism 62 is used to lock the adjusting ring 60 in place, i.e. to prevent further rotation of the adjusting ring 60, once the desired tooth contacts and preloads are achieved. One locking mechanism 62 is associated with each of the differential bearings 40, 42. The locking mechanism 62 that is associated with the first differential bearing 40 will be discussed in detail below with the understanding that the locking mechanism 62 associated with the second differential bearing 42 would be similarly configured.

Figure 3:
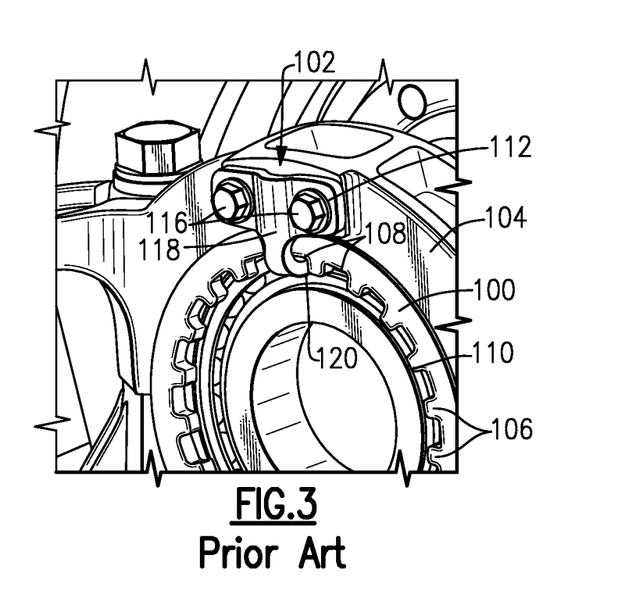
FIG. 3 is a prior art example of an adjusting ring and lock tab assembly.

An example of a prior art adjusting ring 100 and lock tab assembly 102 is shown in FIG. 3. The adjusting ring 100 is threaded into engagement with a bearing mount structure 104. A plurality of teeth 106 are formed on one end face of the ring 100 and are separated from each other by grooves 108. The teeth 106 are formed on an inner peripheral surface 110 of the ring 100 and extend radially inward toward a center of the adjusting ring 100. Rotation of the adjusting ring 100 relative to the bearing mount structure 104 sets the desired bearing preload. Once the desired bearing preload is set, the lock tab assembly 102 is installed to lock the adjusting ring 100 in place.

The traditional lock tab assembly 102 includes a plate 112 that is attached to an enlarged mounting boss 114 formed on the bearing mount structure 104 with a pair of fasteners 116. The plate 112 includes a curved lock finger 118 that extends radially inward toward the center of the adjusting ring 100. A distal end 120 of the curved lock finger 118 is received within one of the grooves 108. Once the lock finger 118 is positioned within a groove 108, the adjusting ring 100 is no longer able to rotate.

This traditional configuration has several disadvantages. For larger sized carriers, the flange side differential bearing and adjusting ring have increased outer diameters in order to provide a desired load carrying capacity and life requirement. Further, the bearing mount structure has an enlarged mounting boss portion in order to properly mount the plate. These larger diameters and the enlarged mounting boss have resulted in the lock tab being offset from a center of the differential to a point where the plate and fasteners protrude beyond a housing wall of the bowl portion, i.e. there is no longer sufficient clearance between the lock tab assembly and the bowl portion of the housing.

The subject locking mechanism 62 allows the traditional lock tab assembly 102 and associated mounting boss material to be removed from the bearing mount structure, which provides the desired clearance to the bowl portion of the carrier. The subject locking mechanism 62 is shown in greater detail in FIGS. 4-7.

Figure 7:
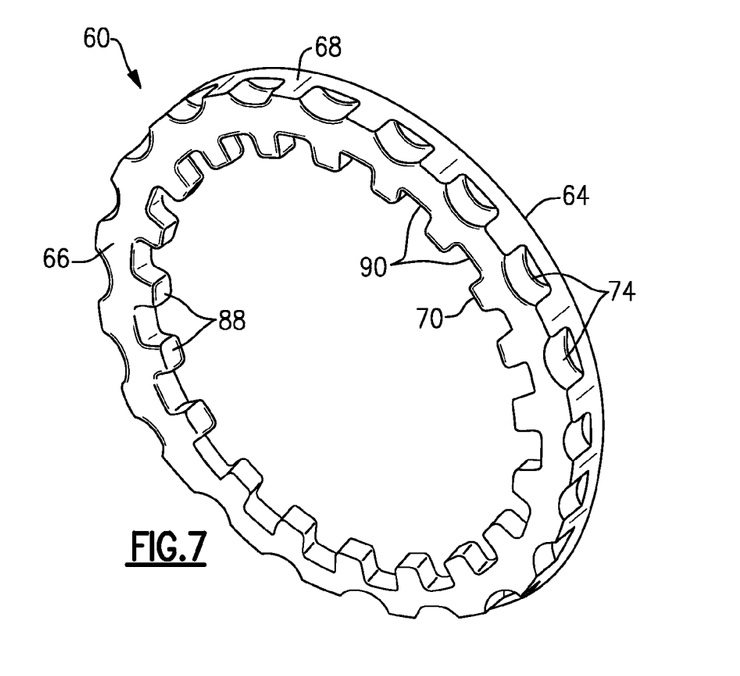
FIG. 7 is a perspective view of an adjusting ring of the locking mechanism of FIG. 4.

As best shown in FIG. 7, the adjusting ring 60 has an inboard end face 64 that faces inward toward the differential case and an outboard end face 66 that faces outwardly from the differential case. The adjusting ring 60 includes an outer peripheral surface 68 and an inner peripheral surface 70. The outer peripheral surface 68 comprises a threaded surface that is received within a corresponding threaded opening 72 (FIG. 5) formed within the bearing mount structure. The adjusting ring 60 is threaded into this opening 72 until the inboard end face 64 abuts against the first differential bearing 40. The adjusting ring 60 is rotated against the bearing 40 until the desired preload is set.

A plurality of pockets 74 (see FIGS. 4 and 7) are formed in the outer peripheral surface 68 at the outboard end face 66. The pockets 74 can be cast or machined into the adjusting ring 60, for example. The pockets 74 are circumferentially spaced apart from each other about the axis A. In the example shown, the pockets 74 are defined by a curved/arcuate surface; however, other surface profiles could also be used. The pockets 74 added to the outer diameter of the adjusting ring 60 produces an interrupted external thread for a portion (FIG. 7) of a width of the adjusting ring 60 at the outboard end face 66.

Figure 6:
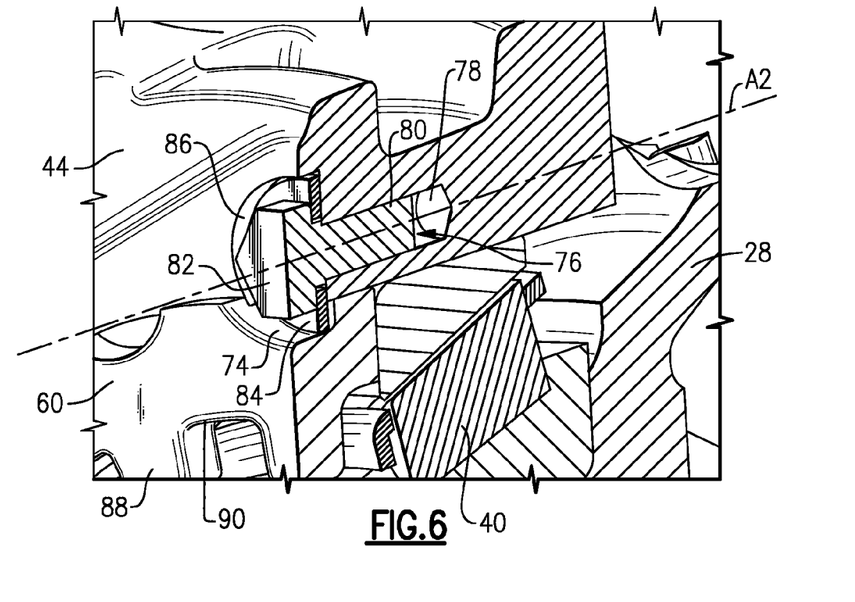
FIG. 6 is an enlarged section view of the locking mechanism of FIG. 4.

The locking mechanism 62 also includes at least one retainer 76 that is mounted to the bearing mount structure. In one example, the retainer could be mounted to the mounting boss 48 or leg cap 44 of the bearing mount structure. In the example shown in FIGS. 4-7, the differential leg cap 44 includes a hole or bore 78 that is configured to receive the retainer 76. The bore 78 defines a central axis A2 (FIG. 6) that is generally parallel to the axis A about which the adjusting ring 60 rotates. The retainer 76 comprises a mount portion 80 and a retaining portion 82. After gear contacts and preloads are set by rotating the adjusting ring 60, the retainer 76 is installed such that the retaining portion 82 is at least partially received within one of the pockets 74 to prevent further rotation of the ring 60 (FIG. 6). The retainer is tightened against the bearing mount structure and not against the adjusting ring such that the gear contacts and preloads are not affected as the retainer is secured in place. Once tightened, the retainer simply sits within the pocket to prevent further rotation without disturbing the set adjustment.

In one example, the retainer 76 comprises a fastener. In this example, the mount portion 80 comprises a fastener body portion and the retaining portion 82 comprises an enlarged fastener head portion. In one example, the fastener comprises a socket head cap screw or flanged head screw that increases contact area within the pockets 74. Other fasteners could also be used; however, the diameter of the head portion should be large enough to provide sufficient contact area to prevent rotation of the adjusting ring once installed.

In one example, a washer 84 is installed between the retaining portion 82 and an outboard end face of the differential leg cap 44. An enlarged bore area 86 is formed within the differential leg cap 44 to receive the washer 84. The washer 84 also partially fits into the pocket 74 to prevent rotation.

In one example, the adjusting ring 60 includes a plurality of teeth 88 that are formed on the outboard end face, and which are separated from each other by grooves 90. The teeth 88 are formed on the inner peripheral surface 70 of the ring 60 and extend radially inward toward a center of the adjusting ring 60. The teeth 88 are used for adjustment setting purposes. In an alternate configuration, the pockets 74 could be of such a size and a shape such that the pockets could also be used for adjustment setting purposes, which would allow the internal teeth 88 to be eliminated from the design and provide a cost reduction.

Figure 8:
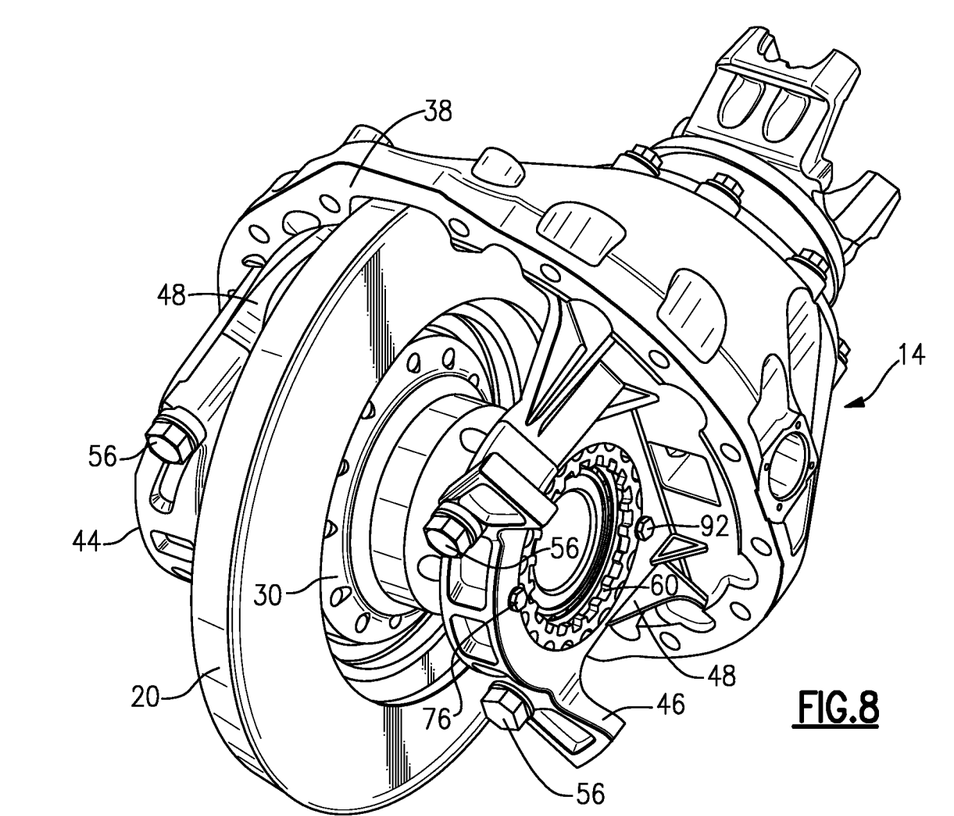
FIG. 8 is a perspective view of a differential assembly with an alternate configuration.

In the examples discussed above, the bearing mount structure only includes one bore 78 and only one retainer 76 is used to lock the adjusting ring 60 in place. The benefit to this configuration is ease of assembly and reduced cost. In an alternate configuration, such as that shown in FIG. 8 for example, additional bores 78 can be formed within the bearing mount structure in the differential leg cap 44 and/or within the mounting boss 48. The bores 78 are formed about a periphery of the threaded opening 72. The bores 78 can provide alternate locations for the retainer 76, or optionally, a second retainer and washer assembly 92 could be included to further lock the adjusting ring 60 in place. In the example of FIG. 8, the retainer 76 is mounted within leg cap 44 while the second retainer and washer assembly 92 is mounted within the mounting boss 48. While this would increase cost and assembly time, it could prevent a potential "cam out" if only one retainer were used. Further, FIG. 8 shows an example configuration of the adjusting ring 60 being mounted to the plain case half 30.

The subject locking mechanism 62 can be used in various different carrier configurations, such as the rigid drive axle configuration shown in FIG. 1, or can be used in other carrier configurations such as a drive unit for independently suspended wheels, for example. The subject locking mechanism 62 can also be used in differential assemblies having different design configurations. The differential assembly discussed above is just one example design configuration. For example, the differential case comprised of the plain and flange case halves can have different designs of varying shapes/sizes depending upon vehicle application and customer requirements. Further, the differential leg caps and mounting bosses could also have different design configurations to meet desired specifications.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A locking mechanism for a differential assembly comprising:
   an adjusting ring rotatable about an axis and having an inner peripheral surface and an outer peripheral surface, said adjusting ring including a plurality of pockets formed within said outer peripheral surface and circumferentially spaced apart from each other about said axis; and
   at least one retainer having a body portion and an enlarged head portion of greater diameter than the body portion, the head portion at least partially received within one of said pockets to prevent rotation of said adjusting ring about said axis.

2. The locking mechanism according to claim 1 wherein said body portion is configured to be fixed to a structure separate from said adjusting ring.

3. The locking mechanism according to claim 2 wherein said adjusting ring includes a threaded surface configured for attachment to the structure.

4. The locking mechanism according to claim 1 wherein said at least one retainer comprises at least one fastener.

5. The locking mechanism according to claim 4 wherein said at least one fastener comprises only one fastener.

6. The locking mechanism according to claim 4 wherein the fastener comprises a screw.

7. The locking mechanism according to claim 6 wherein the fastener comprises a socket head cap screw.

8. The locking mechanism according to claim 6 wherein the fastener comprises a flanged head screw.

9. A carrier for an axle assembly comprising:
   a housing including a bowl portion;
   first and second differential bearings respectively mounted within first and second bearing mount structures positioned within said bowl portion;
   a differential assembly mounted within said bowl portion, said differential assembly including a differential gear set enclosed within a differential case comprised of first and second case halves respectively supported by said first and second differential bearings; and
   a locking mechanism including at least one adjusting ring rotatable about an axis and having an inner peripheral surface and an outer peripheral surface, said adjusting ring including a plurality of pockets formed within said outer peripheral surface and circumferentially spaced apart from each other about said axis, and said locking mechanism including at least one retainer having a body portion received within a bore in one of said first and second bearing mount structures and an enlarged head portion that is at least partially received within one of said pockets to prevent rotation of said adjusting ring about said axis when said body portion is fixed to said one of said first and second bearing mount structures.

10. The carrier according to claim 9 wherein said at least one retainer comprises at least one fastener.

11. The carrier according to claim 10 including a washer installed between said enlarged head portion and said one of said first and second bearing mount structures.

12. The carrier according to claim 9 wherein said locking mechanism has only one retainer.

13. The carrier according to claim 9 wherein said adjusting ring includes an inboard end face facing said differential case and an outboard end face facing away from said differential case, and wherein said plurality of pockets are formed at said outboard end face.

14. The carrier according to claim 13 wherein said adjusting ring includes a threaded portion formed within said outer peripheral surface adjacent said inboard end face, and wherein said one of said first and second bearing mount structures includes a threaded opening that receives said threaded portion of said adjusting ring.

15. The carrier according to claim 14 wherein said inboard end face of said adjusting ring abuts against one of said first and second first differential bearings to set a desired bearing preload as said adjusting ring is rotated about said axis.

16. The carrier according to claim 9 wherein said bore defines a central axis that is parallel to said axis about which said adjusting ring rotates.

17. The carrier according to claim 9 wherein said at least one retainer comprises a plurality of retainers, and wherein said one of said first and second bearing mount structures includes a plurality of bores configured to receive said plurality of retainers.

18. A method of locking an adjusting ring comprising the steps of:
   (a) providing an adjusting ring having an inner peripheral surface and an outer peripheral surface with a plurality of pockets formed within the outer peripheral surface;
   (b) threadably attaching the adjusting ring to a bearing mount structure to set a desired differential bearing preload; and
   (c) inserting at least one retainer into a bore formed in the bearing mount structure such that a retaining portion of the retainer is at least partially received within one of the plurality of pockets to prevent further rotation of the adjusting ring once the desired differential bearing preload is achieved,
   wherein the retainer comprises a fastener with the retaining portion comprising an enlarged fastener head portion formed on an end of a fastener body portion, and including inserting the fastener body portion into the bore and positioning the enlarged fastener head portion to be at least partially received within one of the plurality of pockets.

19. The method according to claim 18 wherein step (c) includes inserting only one retainer to lock the adjusting ring in place.

20. The method according to claim 18 wherein the bearing mount structure includes an opening that receives the adjusting ring, and including the steps of forming a plurality of bores in the bearing mount structure about the opening, performing step (b), and then inserting one or more retainers into the bores to lock the adjusting ring in place.

* * * * *